(12) United States Patent
Ellis

(10) Patent No.: US 7,261,930 B2
(45) Date of Patent: Aug. 28, 2007

(54) MOULDING MATERIALS

(75) Inventor: John Ellis, Duxford (GB)

(73) Assignee: Hexcel Composites, Ltd., Duxford (GB)

( * ) Notice: Subject to any disclaimer, the term of this patent is extended or adjusted under 35 U.S.C. 154(b) by 0 days.

(21) Appl. No.: 10/366,026

(22) Filed: Feb. 12, 2003

(65) Prior Publication Data

US 2003/0157309 A1    Aug. 21, 2003

(30) Foreign Application Priority Data

Feb. 19, 2002    (GB) ................................. 0203823.0

(51) Int. Cl.
*B32B 5/12* (2006.01)
*B32B 27/04* (2006.01)

(52) U.S. Cl. ................... 428/114; 428/138; 428/298.1; 428/300.7; 428/319.3

(58) Field of Classification Search ............. 428/542.8, 428/137, 138, 131, 298.1, 114, 300.7, 319.3; 442/266, 367, 368, 381, 391, 394, 395, 366
See application file for complete search history.

(56) References Cited

U.S. PATENT DOCUMENTS 3,472,730 A * 10/1969 Frigstad ..................... 156/182
4,213,930 A    7/1980 Goodrich et al.
5,641,366 A *  6/1997 Hohman .................... 156/62.8
6,096,669 A *  8/2000 Colegrove et al. .......... 442/366

FOREIGN PATENT DOCUMENTS

| EP | 0 583 090 A1 | 2/1994 |
| JP | 2002-249605 | 6/2002 |
| WO | WO98/34979 | 8/1998 |
| WO | WO 00/27632 | 5/2000 |

* cited by examiner

*Primary Examiner*—N. Edwards
(74) *Attorney, Agent, or Firm*—W. Mark Bielawski; David J. Oldenkamp

(57) ABSTRACT

Moulding material that includes a layer of fibrous reinforcing material having one surface on which a first layer of a resin partially impregnates the fibrous material and a further resin layer located on the opposite surface which retains in position surface fibers of the fibrous material. The further resin layer is of lower weight than the first layer and is formed as an openwork structure with a solid part and spaces through which the fibrous material is exposed.

28 Claims, 3 Drawing Sheets

MOULDING MATERIALS

BACKGROUND OF THE INVENTION

1. Field of the Invention

This invention relates to composite moulding materials or pre-forms of resin and reinforcement fiber in which the resin is only partially impregnated into the fiber.

2. Description of Related Art

Such pre-forms are normally supplied in a continuous roll but may also be provided as pre-cut sheets. In either case the material may be laid up in multiple layers on a shaped moulding surface, alone or in combination with further resin, and then processed (e.g., by application of heat and pressure) to form strong, lightweight structures, e.g., for use in forming panels or body sections or components in aerospace, automotive, wind energy or other contexts.

The fibrous reinforcing material may be partially or substantially fully impregnated with the resin in the pre-form, resulting in a so-called semi-preg or pre-preg. The fibrous material advantageously may comprise tows with fibers which are unidirectional, i.e., which extend predominantly in a common direction, since this facilitates manufacture of strong laminates of high mechanical integrity suited to the production of relatively long, large and thick structures such as wind energy blades.

Semi-pregs in which the fibrous material is only partially resin-impregnated so as to leave a 'dry' outer surface, i.e., a surface having free fibers not impregnated by resin, can advantageously facilitate ready release of trapped air during processing which minimizes void content and consequent mechanical weakening in the finished product. However, there is the problem that a unidirectional alignment of the exposed dry fibers on the outer surface tends to become disrupted during handling, cutting and laying-up with consequent reduction in mechanical integrity of the finished product. Moreover, contaminant fibrous debris may be produced.

Disruption of fiber alignment can be avoided with conventional pre-pregs due to the full resin impregnation of the fibrous material, but with these materials, problems of handling and void content can arise particularly when using heavy fiber bundles.

WO 00/27632 provides an example disclosure of a semi-preg which has exposed dry fibers and which would therefore exhibit the above mentioned fiber-disruption problem.

EP 0583090 A describes sandwiching of fibrous material between resin films. The fibrous material is impregnated by the resin matrix which would prevent surface disruption of fibers. However, this technique, particularly if used with substantial unidirectional fiber tows, would tend to give only partial impregnation thereby leading to air entrapment in the dry fibers in the center of the pre-form causing voids and consequent poor mechanical strength in the finished product.

With a view to improving mechanical integrity, it is known to cross-stitch unidirectional fiber tows. This is described in WO98/34979 in the context of a semi-preg. However, loose or broken filaments from the stitching process can cause performance deterioration in the laminate and also does not necessarily solve the handling problems associated with unidirectional tows.

Warp fiber bundles can be held together in pre-forms with thermoplastic stabilizing yarns. However, if the melting point of the thermoplastic is higher than the processing temperature of the pre-form resin matrix, the yarns can give rise to fiber distortion, and hence poor mechanical properties, where the weft yarns are crimped over the warp. If the thermoplastic has a lower melting point than the resin matrix processing temperature, the thermoplastic melts and flows into the resin matrix producing voids in the finished product.

U.S. Pat. No. 6,096,669 describes the formation of a pre-form obtained by sandwiching unidirectional fiber tows between resin films which are in the form of openwork diamond-pattern grids. The grids act to hold the fibers in position but are relatively insubstantial and a resin matrix is introduced externally by penetration through the grids using a conventional so-called resin transfer moulding process. Such processes are used for production of relatively small, short length structures and are not appropriate for larger, longer length structures, where adequate resin flow along the fiber pre-form cannot be ensured.

U.S. Pat. No. 4,213,930 describes the use of a gravure roll to apply small amounts of resin to the surface of a pre-preg to improve surface tack on a fully impregnated pre-form.

SUMMARY OF THE INVENTION

An object of the present invention is to provide a semi-preg pre-form having dry surface fibers which are reliably held in position in an improved manner conducive to production of composites having high mechanical integrity.

According to the invention therefore there is provided a moulding material comprising a layer of fibrous reinforcing material having on opposite surfaces thereof, respectively, a first layer of resin which partially impregnates the fibrous material, and a further resin layer which retains in position surface fibers of the fibrous material, characterized in that the further resin layer is of lower weight than the first layer and is formed as an openwork structure with spaces through which the fibrous material is exposed.

With this arrangement, the moulding material is of the nature of a semi-preg, due to the first resin layer, whereby the moulding material can be processed to form structures without requiring significant introduction of an externally introduced resin matrix. Moreover, the openwork further resin layer can hold surface fibers of the fibrous material securely and smoothly in position without restricting air flow for escape of entrapped air.

The moulding material is therefore particularly suitable for use in producing relatively large, long structures which are substantially void-free and have high mechanical strength and integrity.

The above discussed and many other features and attendant advantages of the present invention will become better understood by reference to the detailed description when taken in conjunction with the accompanying drawings.

DETAILED DESCRIPTION OF THE INVENTION

Figure 1:
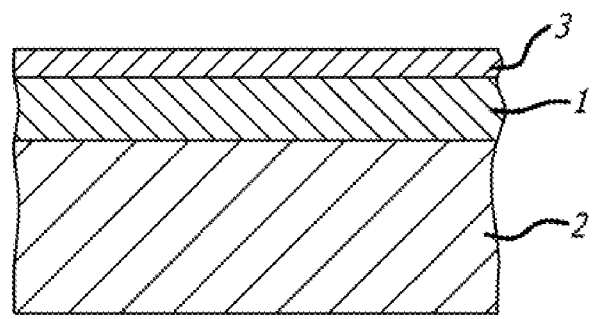
FIG. 1 is a diagrammatic sectional view of one form of a moulding material according to the invention in accordance with Examples 2-5.

The fibrous reinforcing material is preferably of the unidirectional kind, i.e., having fibers predominantly extending substantially in a common direction. Thus, the fibrous material may comprise multiple side-by-side tows, i.e., loose bundles of fibers. The tows and the fibers may all extend in the common direction, or there may be some transverse fibers. In the latter case, the transverse fibers are preferably such as to exert little or no positional or dimensional control on the unidirectional fibers.

Most preferably the moulding material is of elongate form particularly in the form of sheeting or a strip or tape. Preferably, also, where unidirectional fibrous material is used, the fiber common direction is preferably the longitudinal direction of the moulding material.

The fibrous material may be formed from any suitable kind of material or combination of material including synthetic and natural fibers, glass, ceramic, metal and carbon fibers. Materials which may have very small filament diameters, such as carbon fibers are specially suitable.

The fibers may be continuous or may have discontinuities and they, for example, may be stretch-broken or otherwise selectively discontinuous.

Discontinuous fibers can give enhanced drape and formability in the longitudinal direction. In this case, advantageously, the openwork further layer can help avoid movement of loose ends thereby improving mechanical properties by minimizing misalignment.

The first resin layer is preferably a solid, substantially continuous film (i.e., substantially without spaces or openings therein) which may be sticky or tacky to the touch but is sufficiently coherent and solid as to be self-supporting at normal temperatures. This layer may be formed wholly from resin material or it may incorporate reinforcements or other materials. In one embodiment the first resin layer may be a pre-preg layer.

The resin of the first layer is preferably (although not necessarily) a heat-curable thermosetting resin matrix, and the first layer is preferably of sufficient quantity to impregnate all or at least a major part of the fibrous material during processing of the moulding material, e.g., when subjected to heat and pressure.

The further layer is preferably formed from a resin the same as or similar in properties to the resin of the first layer. Thus, the resin of the further layer is preferably sufficiently solid and coherent as to be self-supporting at normal temperatures and in a heat-curable thermosetting resin matrix. Thus, on processing of the moulding material the resin of the further layer may blend smoothly with the resin of the first layer without adversely affecting the integrity of the cured component.

With regard to the openwork structure of the further resin layer this may take any suitable form appropriate to positional retention of the fibers without significantly occluding the surface of the fibrous layer.

Preferably, solid parts of the further layer occupy a minor proportion of the surface area of the fibrous layer, the spaces therein collectively making up the major part. The solid parts may occupy less than 25% of the surface area, say 4% to 24% of the area.

The further layer may comprise linked or continuous solid parts such as a grid pattern of solid linear elements enclosing geometrical spaces, or a perforate web having regular or irregular spaces, which spaces may be circular, hexagonal or any other suitable shape. Alternatively, the further layer may comprise wholly separate or discontinuous solid parts which may be linear elements or other shaped parts, such as parallel lines, chevrons, dots, broken lateral lines or the like. Broken lines may be particularly preferred to facilitate air flow.

The further layer may be applied in any suitable manner. This may comprise transfer, e.g., via a transfer film, or by direct application to the surface. Suitable application techniques include gravure printing, reverse roll coating, forward roll coating, scatter coating, spraying, powder coating, resin gun or cartridge deposition, etc.

It is also possible to establish the further layer by pull-through of resin material from the first layer. This may be done by an ultrasonic technique. This pull through may result in discrete solid parts, i.e., such that the further layer is separate from the first layer, or linked solid parts, i.e., with linking strands extending between the further and first layer through the fibrous material.

The amounts and relative proportions of the resin in the first and further layers will be selected in accordance with requirement. Most preferably, the amount of resin in the first layer is a multiple of the amount in the further layer.

Preferably, the proportion of total resin content for the further layer is up to 5%, most preferably up to 1%, the balance being provided by the first layer.

By way of example, the resin of the first layer may amount to 30 to 50% by weight, particularly 35 to 40% of the moulding material, and the resin of the further layer may amount to 0.1 to 20%, more preferably 0.1 to 10%.

When the openwork structure is applied from a resin-solvent mixture, the resin content can be controlled to within 0.1-10.0%, more preferably 0.1-1.0%. When solvent-free (hot melt) techniques are employed, the resin content can be controlled in the range of 1.0-20%, more preferably 0.1-10%.

Thus, the resin in the further layer may be of the order of 1 to 2 gsm or to 30 gsm from a resin solvent mixture or 2 gsm to 60 gsm when solvent-free (hot melt) resin, and in the first layer of the order of 75 to 150 gsm or to 280 gsm, and the moulding material may be 200 or 300 to 500 gsm or 700 gsm including the resin and the fibrous material, considered in relation to a single layer of fibrous material and a single said first resin layer.

Using carbon fiber as the fibrous material areal weight, any range from 80 to 6000 gsm, more preferably 100 to 2500 gsm and most preferably 150 to 2000 gsm, and the carbon fiber filament count may be 3000 to 320000, more preferably 12000 to 160000 and most preferably 24000 to 80000.

In one example, the moulding material contains 500 gsm carbon fiber, 280 gsm first resin layer, and 20 gsm further resin layer. In another example, the material contains 150 gsm carbon fiber, 92 gsm first resin layer, and 2 gsm further resin layer.

The resin material of the first and/or further resin layers may be any suitable thermosetting or thermoplastic material, preferably thermosetting.

Thus, the resin may comprise an epoxide resin, bismaleimide, a phenolaldehyde resin or any other suitable resin. Curing agents and other performance enhancing additives such as flame retardants, anti-fouling agents and tougheners may be incorporated.

Mixtures of resins may be used, e.g., a mixture of a thermosetting and a thermoplastic resin.

Semi-impregnation of the fibrous material by the resin of the first layer may be effected under appropriate temperature and pressure, the temperature being lower than that required for curing. Typically the temperature may be in the range 40° C.-160° C., particularly 90°-120° C.; and the pressure may be 40-120 psi (2.7-8.3 bar), particularly 80-100 psi (5.5-7.0 bar). These processing conditions will vary for the different combinations of resin and fiber chosen. Methods to measure the extent of resin diffusion into fiber are well known to those in the art and include wicking techniques and micro-dielectric analysis.

The further layer may be contact applied, i.e., such that it rests on the surface or lightly impregnates the fibrous material. Thus, this may be applied at an elevated temperature (below curing temperature) without any significant pressure.

The arrangement may be such that the resin of the first and further layers are separate from each other. Alternatively they may contact each other so as to be interconnected through the fibrous material. This may be achieved by causing portions of the resin of the first layer to extend through the fibrous material to the surface to which the further layer is applied, without wholly impregnating the entire body of fibrous material.

Advantageously, the invention can be applied to the production of a moulding material having multiple layers with one or two dry faces, one or both of which may have a respective further resin layer applied thereto.

In particular, the moulding material of the invention may comprise two layers of fibrous material with a first resin layer sandwiched between and partially impregnating the two fibrous layers, and a further openwork resin layer applied to the outer surface of one or both of the fibrous layers.

The moulding material may have multiple internal layers of any appropriate materials and construction.

Possible constructions include the following:

In one embodiment a resin rich fully impregnated and unidirectional or woven pre-preg can be made and used as the said first layer in place of a film made wholly of resin. Fibrous material, e.g., in the form of additional fiber tows can then be placed on top of this film followed by the openwork resin layer.

In a further embodiment, a resin rich fully impregnated unidirectional or woven pre-preg can be made and additional fibrous material (e.g., fiber tows) then placed on both sides of this pre-preg. Openwork resin can then be coated onto both dry fiber surfaces.

In a yet further embodiment, an additional layer of material such as dry textiles, a gel coat film or intumescent can be laminated, e.g., onto the said first layer.

Also scrims, gauzes, non-wovens, and mats can be incorporated. Typically these may be less than 20 gsm in weight.

Many other variations, involving sequential addition of resin-film, fiber and other material layers, are possible. This also permits the use of hybrid fiber layers.

The present invention may find particular application in the context of relatively massive long length components such as wind energy blades. However, it is not restricted to this field of application and may be used for aerospace, automotive or other applications.

The invention will now be described further with reference to the following Examples. Example 1 is for comparison purposes. Examples 2-7 are in accordance with this invention.

In these Examples reference is made to Hexcel epoxy M9.6. This is a proprietary medium tack formulated epoxy resin which is suitable for low pressure moulding processes and is available from Hexcel Corporation (Duxford, England). It is very versatile and allows a range of processing temperatures from 75° C. up to 160° C.

M9.1 is a higher tack version of M9.6 that is also available from Hexcel Corporation (Duxford, England).

913 is proprietary modified epoxy resin which is available from Hexcel Corporation (Duxford, England) and has a typical cure cycle of 1 hour at 120° C.

EXAMPLE 1

A semi-pre-preg material was made at 300 mm wide from unidirectional carbon fiber tows in sheet form of 150 gsm fiber areal weight and 92 gsm heat curable resin matrix on one face. The fiber used was Fortafil® F510-80K and the resin matrix was Hexcel epoxy M9.6. Additional examples were replicated using Tenax® STS-24K fiber and M9.1 resin.

The processing conditions of temperature, pressure and line speed were such as to cause the resin matrix to penetrate only partially into the carbon fiber layer.

The resulting product had a continuous tacky resin layer on one face and dry fibers on the opposite second face. The fibers were aligned in the warp direction (longitudinally) with no added weft material. The product had a total weight of 242 gsm with 38% by weight of resin. The second face was freely exposed and in particular had no resin material applied thereto.

EXAMPLE 2

A semi-pre-preg material was made in like manner to Example 1 at 300 mm wide with M9.6 resin and F510-80K fiber. In addition, transverse lines of 913 resin were applied to the dry face.

The transverse lines were applied to a release paper using a gavure roll and were then transferred from the paper to the dry face of the semi-preg. The resin applied to the dry face amounted to 2 gsm.

EXAMPLE 3

A semi-pre-preg material was made at 300 mm wide from unidirectional F510-80K carbon fiber tows in sheet form of 500 gsm fiber areal weight and 280 gsm heat curable M9.6 resin matrix on one face.

The processing conditions of temperature, pressure and line speed were such as to cause the resin matrix to penetrate only partially into the carbon fiber layer.

Transverse lines of the same M9.6 resin were applied to the dry face.

The lines were applied to a release paper using a reverse roll coating process and were then transferred from the paper to the dry face of the semi-preg. The resin applied to the dry face amounted to 20 gsm.

EXAMPLE 4

A pre-preg material was made at 300 mm wide from unidirectional F510-80K carbon fiber tows in sheet form of 250 gsm fiber areal weight and 280 gsm heat curable M9.6 resin matrix on one face.

Processing conditions for this material were such as to cause the resin matrix to fully impregnate or wet out the tows.

In further steps of the process a dry layer of further unidirectional carbon fiber tows in sheet form of 250 gsm fiber areal weight was applied to the top surface of the pre-preg thereby forming a semi-preg structure. Finally, transverse lines of the same resin were applied to the dry fibrous face defined by the further tows.

The lines were applied to a release paper using a reverse roll coating process and were then transferred from the paper to the dry face of the semi-preg. The resin applied to the dry face amounted to 20 gsm.

EXAMPLE 5

In similar manner to Example 4, a pre-preg material was made at 300 mm wide from unidirectional F510-80K carbon fiber tows in sheet form of 400 gsm fiber areal weight and 280 gsm heat curable M9.6 resin matrix on one face.

In further steps of the process a dry layer of unidirectional carbon fiber tows in sheet form of 100 gsm fiber areal weight was applied to the top surface of the pre-preg. Finally, transverse lines of the same resin were applied to the dry fibrous face.

The lines were applied to a release paper using a reverse roll coating process and were then transferred from the paper to the dry face of the semi-preg. The resin applied to the dry face amounted to 20 gsm.

EXAMPLE 6

In similar manner to Example 4 a pre-preg material was made at 300 mm wide from unidirectional F510-80K carbon fiber tows in sheet form of 250 g/m$^2$ fiber areal weight and 280 gsm heat curable M9.6 resin matrix on one face.

In further steps of the process a dry layer of unidirectional carbon fiber tows in sheet form of 125 gsm fiber areal weight was applied to both surfaces of the pre-preg.

Transverse lines of the same resin were then applied to the dry fibrous faces on both surfaces of the product. The lines were applied to a release paper using a reverse roll coating process and were then transferred from the paper to the dry face of the semi-preg. The resin applied to the dry face amounted to 20 gsm.

EXAMPLE 7

In similar manner to Example 4, a pre-preg material was made at 300 mm wide from unidirectional F510-80K carbon fiber tows in sheet form of 250 gsm fiber areal weight and 280 gsm heat curable M9.6 resin matrix on one face.

In further steps of the process a dry layer of unidirectional carbon fiber tows in sheet form of 250 gsm fiber areal weight was applied to one surface of the pre-preg. Transverse lines of the same resin were applied to the dry fibrous face. The lines were applied to a release paper using a reverse roll coating process and were then transferred from the paper to the dry face of the semi-preg. The resin applied to the dry face amounted to 20 gsm.

A continuous film of curable resin matrix for surface finishing aspects or a continuous film of curable gel-coat material was applied to the other pre-preg surface.

Referring to FIG. 1 this shows a fibrous reinforcing layer 1, which in the Examples comprises carbon fiber tows; a resin layer 2 applied to a lower face of the fiber tows which in the Examples which in the Examples may be a film formed wholly of resin material which partially penetrates the fiber tows, or a pre-preg comprising fiber tows fully impregnated with resin which may also partially penetrate the overlaid fiber tows; and an openwork structure 3 of resin lines applied to the exposed dry top face of the tows and which penetrates only minimally into the fiber tows.

Figure 2:
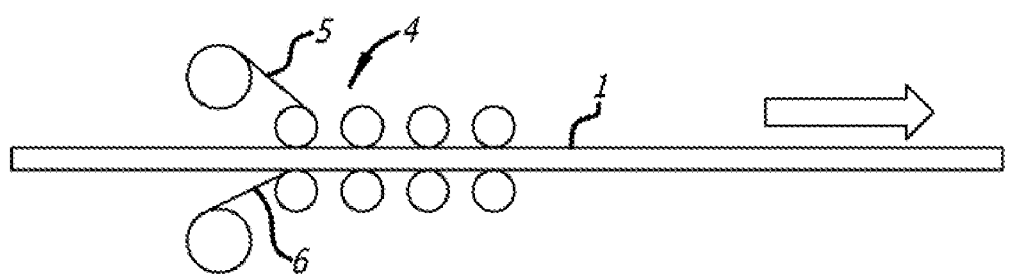
FIG. 2 is a diagrammatic representation of processing equipment used in forming the moulding material of Examples 2-5.

As shown in FIG. 2, the moulding material may be made by feeding the fiber tows 1 through roller nips 4 together with top and bottom materials 5, 6 carried on release paper supplied from reels.

The top material 5 comprises the openwork resin grid lines 3.

The bottom material 6 comprises the resin film 2, in the case of Examples 2 and 3, or the pre-preg 2 in the case of Examples 4 and 5.

The combined layers 1-3 are driven through the nip rollers 4 which apply pressure and at the same time the material is heated.

The extent of impregnation of the fiber tows 1 is controlled by the process conditions of speed, temperature and pressure. The exposed surface of the fiber tows 1 can be substantially free of resin. Some cold flow of resin can occur at the boundaries of the tow layer, but this can be restricted by selection of the materials and process conditions.

Appropriately supplemented and/or modified apparatus is used for Examples 6 and 7, involving passage of materials through roller nips with application of heat and pressure. The dry reinforcement fibers may be introduced as shown in FIG. 2 or alternatively can be introduced at different states in the process route. Normally at least 20% of the fibers are required to be fed in at the start of the process.

Techniques for forming the prepreg layer are also well known and include solvent-free (hot melt) processing via single or double sided resin film impregnation or solution processing by immersion a resin bath, metering the desired resin quantity and then removing solvent in an oven module.

With regard to the openwork grid lines applied to the dry fiber tow surface, possible patterns are shown FIGS. 3-9.

Figure 3:
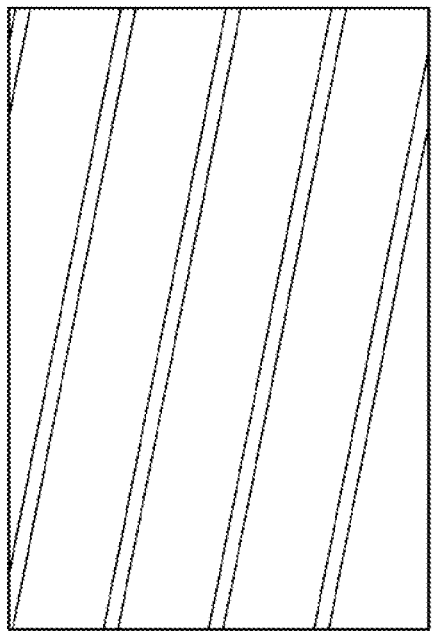
FIGS. 3-9 are diagrammatic plan views of exemplary openwork resin layers applied to the surface of the moulding material.

FIG. 3 shows diagonal lines of 8 mm width (along the web movement direction) with 47 mm spacings therebetween.

Figure 4:
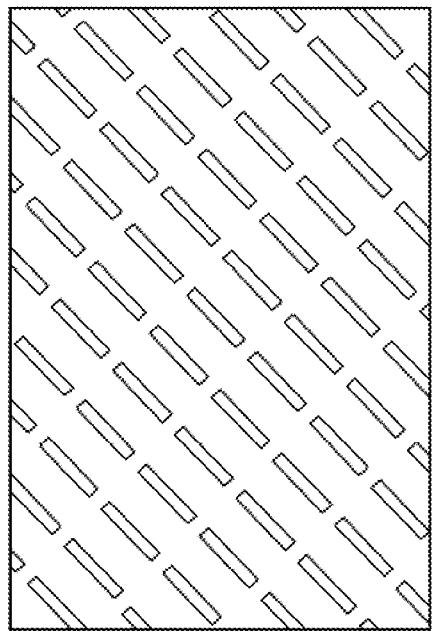

FIG. 4 shows broken diagonal lines the sections being 40 mm long (27 mm in the web direction) with 10 mm between section ends.

Figure 5:
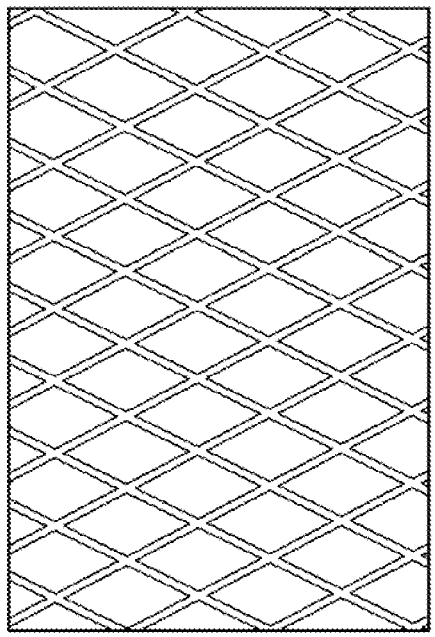

FIG. 5 shows a diamond lattice arrangement, the lines being 4 mm wide and each diamond of the lattice being 78.5 mm by 40 mm respectively longitudinally and transversely of the web direction with a 60° diamond angle.

Figure 6:
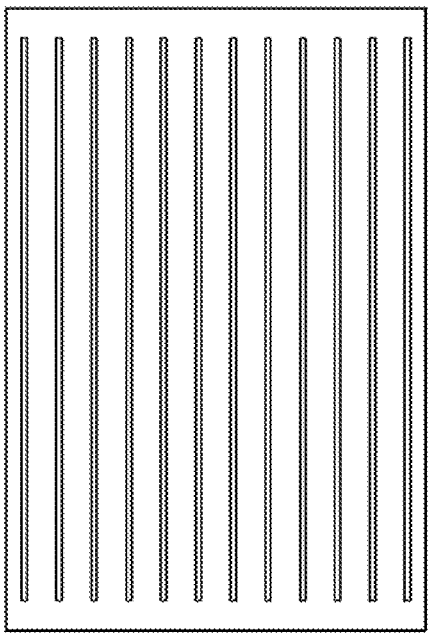

FIG. 6 shows transverse lines of 2 mm width, 20 mm apart.

Figure 7:
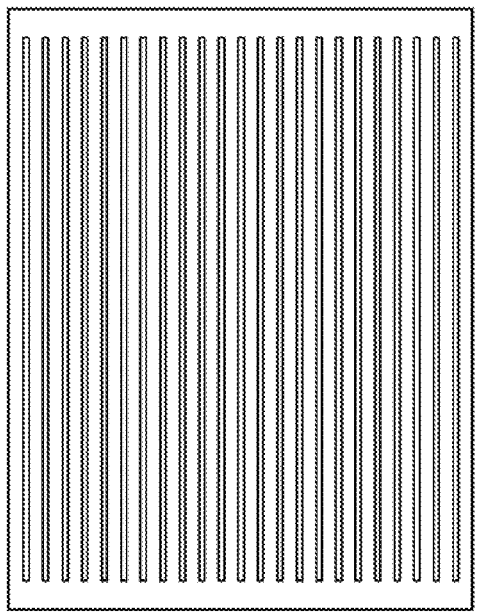

FIG. 7 shows transverse lines of 2 mm width, 10 mm apart.

Figure 8:
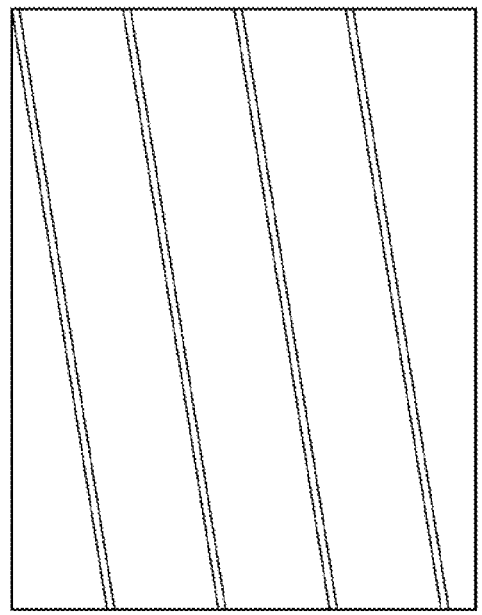

FIG. 8 shows transverse diagonal lines of 4 mm width, 59 mm apart.

Figure 9:
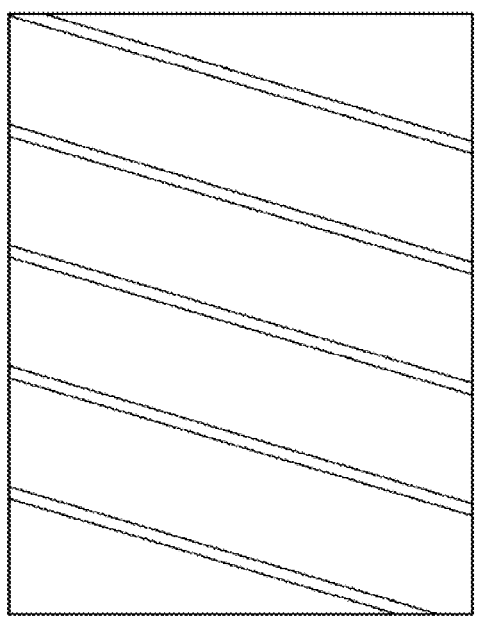

FIG. 9 shows longitudinal diagonal lines of 4 mm width, 64 mm apart.

Further details are shown in the following table:

| FIG. | Resin gsm | Dry fiber gsm | Dry fiber surface area % |
|---|---|---|---|
| 3 | 0.148 | 0.852 | 85.2 |
| 4 | 0.114 | 0.886 | 88.6 |
| 5 | 0.24 | 0.76 | 76 |
| 6 | 0.104 | 0.896 | 89.6 |
| 7 | 0.2 | 0.8 | 80 |
| 8 | 0.074 | 0.926 | 92.6 |
| 9 | 0.04 | 0.96 | 96 |

It will be seen that the solid resin material of the openwork resin structure represents a minor proportion of the surface area, and indeed is essentially insubstantial relative to the overall area. The openwork resin structure is also minor, or even insubstantial, in relation to the overall weight of resin in the moulding material. The choice of selecting the use of continuous or discontinuous grid lines and degree of fiber impregnation is dependent on processing factors such as the equipment used and the rheology of the resin system.

It has, however, been found that discontinuous grid lines appear to be particularly suitable for higher viscosity resins wherein low viscosity resins function satisfactorily in products containing 60% dry fiber.

By way of example, using patterns such as those shown in FIGS. 3-9, the grid lines may account for 2.1% of the total resin in the structure of Example 2, and 6.7% in the structures of Examples 4-7.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the above preferred embodiments and examples, but is only limited by the following claims.

What is claimed is:

1. A moulding material for use in making a moulded product, said moulding material comprising:
   a layer of fibrous reinforcing material having a first side and a second side and wherein the fibrous reinforcing material consists essentially of fibers extending in a common direction;
   a first layer of resin which partially impregnates the fibrous reinforcing material on said first side, said first layer of resin providing a solid film substantially without openings therein and wherein said resin of said first layer amounts to 30 to 50% by weight of said moulding material; and
   a further layer of resin located on said second side of said fibrous reinforcing material, said further layer of resin forming an openwork structure with a solid part and spaces through which the fibrous reinforcing material is exposed and wherein said resin of said further layer amounts to 0.1 to 20% by weight of said moulding material, wherein said first and further layers of resin together amount to 30.1 to 70% by weight of said moulding material.

2. A moulding material according to claim 1 wherein the fibrous reinforcing material comprises multiple side-by-side fiber tows.

3. A moulding material according to claim 1 which is an elongated structure wherein said common direction extends longitudinally of said structure.

4. A moulding material according to claim 1 wherein the fibrous reinforcing material comprises carbon fiber material.

5. A moulding material according to claim 1 wherein the fibrous reinforcing material comprises discontinuous fibers.

6. A moulding material according to claim 1 wherein said first layer of resin comprises a pre-preg layer.

7. A moulding material according to claim 1 wherein said first layer of resin comprises a heat-curable thermosetting resin matrix.

8. A moulding material according to claim 1 wherein said first and further layers of resin are formed from the same resin.

9. A moulding material according to claim 1 wherein the solid part of said further layer of resin occupies a minor proportion of the surface area of the fibrous layer, said spaces therein collectively making up the major part.

10. A moulding material according to claim 9 wherein the solid part occupies less than 25% of the surface area of said second surface.

11. A moulding material according to claim 10 wherein the solid part occupies less than 4% to 24% of the surface area.

12. A moulding material according to claim 1 wherein the solid part comprises a grid pattern of solid linear elements enclosing said spaces.

13. A moulding material according to claim 12 wherein said grid pattern is a regular pattern whereby said spaces are of a common geometrical shape.

14. A moulding material according to claim 1 wherein said further layer of resin comprises a perforate web, perforations therein forming the said spaces.

15. A moulding material according to claim 1 wherein said further layer of resin comprises separate solid parts.

16. A moulding material according to claim 15 wherein the separate solid parts comprise linear elements.

17. A moulding material according to claim 16 wherein the linear elements define lines.

18. A moulding material according to claim 17 wherein said lines are parallel.

19. A moulding material according to claim 17 wherein the lines are broken lines.

20. A moulding material according to claim 1 wherein the amount of resin in said first layer of resin amounts to 35-40% by weight of the moulding material.

21. A moulding material according to claim 1 wherein the amount of resin in said further layer of resin amounts to 0.1 to 1% by weight of the moulding material.

22. A moulding material according to claim 1 wherein the weight of the moulding material is 200-800 gsm.

23. A moulding material according to claim 1 wherein an additional layer of material is incorporated therein.

24. A moulding material sandwich that comprises at least one first body of moulding material according to claim 1 and a further structure applied to said first layer of resin, said structure comprising further fibrous material.

25. A moulding material sandwich according to claim 24 wherein said further structure comprises a body of moulding material according to claim 1 wherein said first body of moulding material and said further structure have a common first resin layer at confronting surfaces thereof, and said further resin layers are located on opposite surfaces thereof.

26. A shaped moulded product made with a moulding material according to claim 1.

27. A moulding material according to claim 1 wherein said first and further layers of resin are linked by resin parts extending through the fibrous material.

28. A moulded product according to claim 26 wherein said moulded product is a wind energy blade.

* * * * *